United States Patent
Im

(10) Patent No.: US 11,358,170 B2
(45) Date of Patent: Jun. 14, 2022

(54) SPRINKLER CENTER BRACKET PROVIDED WITH LOCKER FOR PREVENTING LOOSENING OF CAM LEVER COUPLED THERETO

(71) Applicant: Young Soon Im, Hwaseong-si (KR)

(72) Inventor: Young Soon Im, Hwaseong-si (KR)

( * ) Notice: Subject to any disclaimer, the term of this patent is extended or adjusted under 35 U.S.C. 154(b) by 0 days.

(21) Appl. No.: 17/053,189

(22) PCT Filed: Nov. 27, 2018

(86) PCT No.: PCT/KR2018/014660
§ 371 (c)(1),
(2) Date: Nov. 5, 2020

(87) PCT Pub. No.: WO2020/080599
PCT Pub. Date: Apr. 23, 2020

(65) Prior Publication Data
US 2021/0370335 A1 Dec. 2, 2021

(30) Foreign Application Priority Data
Oct. 15, 2018 (KR) .................. 10-2018-0122730

(51) Int. Cl.
*B05B 15/62* (2018.01)
*A62C 35/68* (2006.01)
*F16B 2/18* (2006.01)

(52) U.S. Cl.
CPC .............. *B05B 15/62* (2018.02); *A62C 35/68* (2013.01); *F16B 2/185* (2013.01)

(58) Field of Classification Search
CPC .......... B05B 15/62; A62C 35/68; F16B 2/185
See application file for complete search history.

(56) References Cited

U.S. PATENT DOCUMENTS 8,500,079 B2 * 8/2013 Oh ................... A62C 35/68
248/230.4
9,174,077 B2 * 11/2015 Lim ................... F16L 3/10
(Continued)

FOREIGN PATENT DOCUMENTS

| KR | 200440808 | 7/2008 |
|---|---|---|
| KR | 100904066 | 6/2009 |

(Continued)

OTHER PUBLICATIONS

International Search Report—PCT/KR2018/014660 dated Jul. 11, 2019.

*Primary Examiner* — Anita M King
(74) *Attorney, Agent, or Firm* — Cantor Colburn LLP

(57) ABSTRACT

Provided is a center bracket for fixing a fire sprinkler and, more particularly, to a sprinkler center bracket having a one-touch-type structure, to which a locker for preventing loosening of a cam lever is coupled. When a locker protrusion is inserted into a locker protrusion hook groove formed in one end portion of a cam protrusion contact portion, wherein the locker protrusion is rotated about a fixing tool of the locker for preventing loosening of the cam lever as a central axis of rotation, the cam lever is rotated in a locking direction in order to fix the sprinkler, and after this, loosening of the cam protrusion contact portion in a direction opposite to the locking direction can be prevented, the cam protrusion contact portion being fixed by an elastic spring hinge pin after the cam lever is rotated in the locking direction to fix the sprinkler.

3 Claims, 7 Drawing Sheets

(56) References Cited

U.S. PATENT DOCUMENTS

| | | | |
|---|---|---|---|
| 9,255,652 B2* | 2/2016 | Kim | F16L 3/00 |
| 9,341,286 B1* | 5/2016 | Oh | A62C 35/68 |
| 10,203,050 B2* | 2/2019 | Jung | F16L 3/1075 |
| 11,035,396 B2* | 6/2021 | Jung | F16L 55/035 |
| 11,219,791 B2* | 1/2022 | Kim | A62C 35/68 |
| 2011/0260012 A1* | 10/2011 | Oh | A62C 35/68 |
| | | | 248/89 |
| 2015/0360064 A1* | 12/2015 | Jung | F16L 3/245 |
| | | | 248/75 |
| 2017/0197101 A1 | 7/2017 | Chong | |
| 2019/0118015 A1* | 4/2019 | Chong | B05B 15/62 |

FOREIGN PATENT DOCUMENTS

| | | |
|---|---|---|
| KR | 20110097660 | 8/2011 |
| KR | 101422086 | 7/2014 |
| KR | 101813010 | 12/2017 |

* cited by examiner

SPRINKLER CENTER BRACKET PROVIDED WITH LOCKER FOR PREVENTING LOOSENING OF CAM LEVER COUPLED THERETO

BACKGROUND OF THE INVENTION

Field of the Invention

The present invention relates to a center bracket for fixing a fire sprinkler, and more particularly to a sprinkler center bracket provided with a locker for preventing unlocking of a cam lever coupled thereto, wherein the locker for preventing unlocking of the cam lever is configured such that, when a locker protrusion, configured to be rotated about a fixing member of the locker for preventing unlocking of the cam lever as a central axis of rotation, is inserted into a locker protrusion catching recess formed in one end of a cam protrusion tight-contact unit, it is possible to prevent the cam protrusion tight-contact unit, fixed by an elastic spring hinge pin, from being unlocked in a direction opposite a locking direction after the cam lever is rotated in the locking direction in order to fix a sprinkler.

Description of Related Art

A fire sprinkler is connected to each of a plurality of branch pipes diverging from a fire extinguishing liquid supply pipe. Fire sprinklers are fixed to a support frame via center brackets so as to be supported by the support frame in the state of being spaced apart from each other by a predetermined distance. There are various kinds of center brackets for supporting sprinklers. One of the center brackets has a split structure, in which slit parts are coupled to each other and the sprinkler is fixed using fastening force of a bolt, whereby the sprinkler is supported.

In such a center bracket, the center bracket is primarily split, the sprinkler is inserted between the split parts of the center bracket, and the split parts of the center bracket are coupled to each other through rotation and fastening of a bolt, which is additionally necessary, in order to support the sprinkler. As a result, work is troublesome and unfastening/fastening of the bolt is difficult.

An integrated center bracket developed by the inventor of the present application is disclosed in Korean Patent No. 10-1422086. In addition, a center bracket for fire sprinklers developed by the inventor of the present application is disclosed in Korean Utility Model Registration No. 20-0440808 and Korean Patent application Publication No. 2011-97660.

A conventional center bracket is coupled to a support frame by fitting, and a center bracket concave recess is formed in each of the upper and lower parts of a bent surface of the center bracket such that a sprinkler is clamped. In the conventional center bracket, a center bracket door is rotatably coupled to one edge of the center bracket via a hinge pin, and a coupling concave recess is formed such that a center bracket space is formed in a sprinkler body in the state of being combined with the center bracket concave recess of the center bracket.

The conventional center bracket has a problem in that, since the center bracket door is not slid to the side opposite a rotational coupling point of the hinge pin while being rotated about the rotational coupling point, it is not possible to rapidly and easily couple the center bracket and the center bracket door to each other. The conventional center bracket has a problem in that, since the center bracket door is not slid to the side opposite the rotational coupling point of the hinge pin while being rotated about the rotational coupling point, a fastening recess of the center bracket door is formed so as to be open at one side thereof. The conventional center bracket has a problem in that, since the fastening recess of the center bracket door is open at one side thereof, coupling between the center bracket and the center bracket door is released or broken when high torque is applied thereto.

The conventional center bracket has a problem in that a fixed cam protrusion tight-contact unit is unlocked in the opposite direction.

BRIEF SUMMARY OF THE INVENTION

The present invention has been made in view of the above problems, and it is an object of the present invention to provide a sprinkler center bracket provided with a locker for preventing unlocking of a cam lever coupled thereto, wherein the locker for preventing unlocking of the cam lever is configured such that, when a locker protrusion, configured to be rotated about a fixing member of the locker for preventing unlocking of the cam lever as a central axis of rotation, is inserted into a locker protrusion catching recess formed in one end of a cam protrusion tight-contact unit, it is possible to prevent the cam protrusion tight-contact unit, fixed as the result of rotation of the cam lever, from being unlocked in the opposite direction.

It is another object of the present invention to provide a sprinkler center bracket provided with a locker for preventing unlocking of a cam lever coupled thereto, wherein it is possible for a user to conveniently lock the locker for preventing unlocking of the cam lever and to easily unlock the locker for preventing unlocking of the cam lever a locked state.

The present invention relates to a sprinkler center bracket provided with a locker for preventing unlocking of a cam lever coupled thereto, the sprinkler center bracket being used to fix a fire sprinkler 200 to end brackets, formed at opposite ends of a support frame 300 in order to fix the support frame to a ceiling, and to the support frame 300, the sprinkler center bracket including a center bracket and a cam protrusion tight-contact unit, the sprinkler center bracket being equipped with the locker 100 for preventing unlocking of the cam lever, wherein the locker 100 for preventing unlocking of the cam lever includes: a locker body 10 configured to be rotated about a fixing member 50 for fixing the locker as a central axis of rotation, wherein the body 10 is provided at one end thereof with a locker protrusion 20 and at the other end thereof with a spring protrusion 30, an elastic spring 60 is installed on the spring protrusion 30, and the body 10 is provided at a central portion thereof with a fixing hole 40; the center bracket 410, which is provided at one side thereof with a fixing protrusion 490, wherein a fixing hole 492 is formed in the fixing protrusion 490, and a locker protrusion through-hole 494 is formed at one side of the fixing protrusion 490; the fixing member 50, which extends through the fixing hole 40 of the locker body 10 so as to be fixed to the fixing hole 492 of the center bracket 410; and a locker protrusion catching recess 480 formed in one end of the cam protrusion tight-contact unit 440.

The present invention has an effect in that, when a locker protrusion, configured to be rotated about a fixing member of a locker for preventing unlocking of a cam lever as a central axis of rotation, is inserted into a locker protrusion catching recess formed in one end of a cam protrusion tight-contact unit, it is possible to prevent the cam protrusion tight-contact unit, fixed by an elastic spring hinge pin, from being unlocked in a direction opposite to a locking direction after the cam lever is rotated in the locking direction in order to fix a sprinkler.

Also, in the present invention, a locker body configured to protrude outwards is provided such that, when the cam lever is rotated in the locking direction, it is possible to confirm a locked state in which unlocking of the cam lever is prevented or to release the locked state by one touch. Consequently, the present invention is a very useful invention.

DETAILED DESCRIPTION OF THE INVENTION

Figure 1:
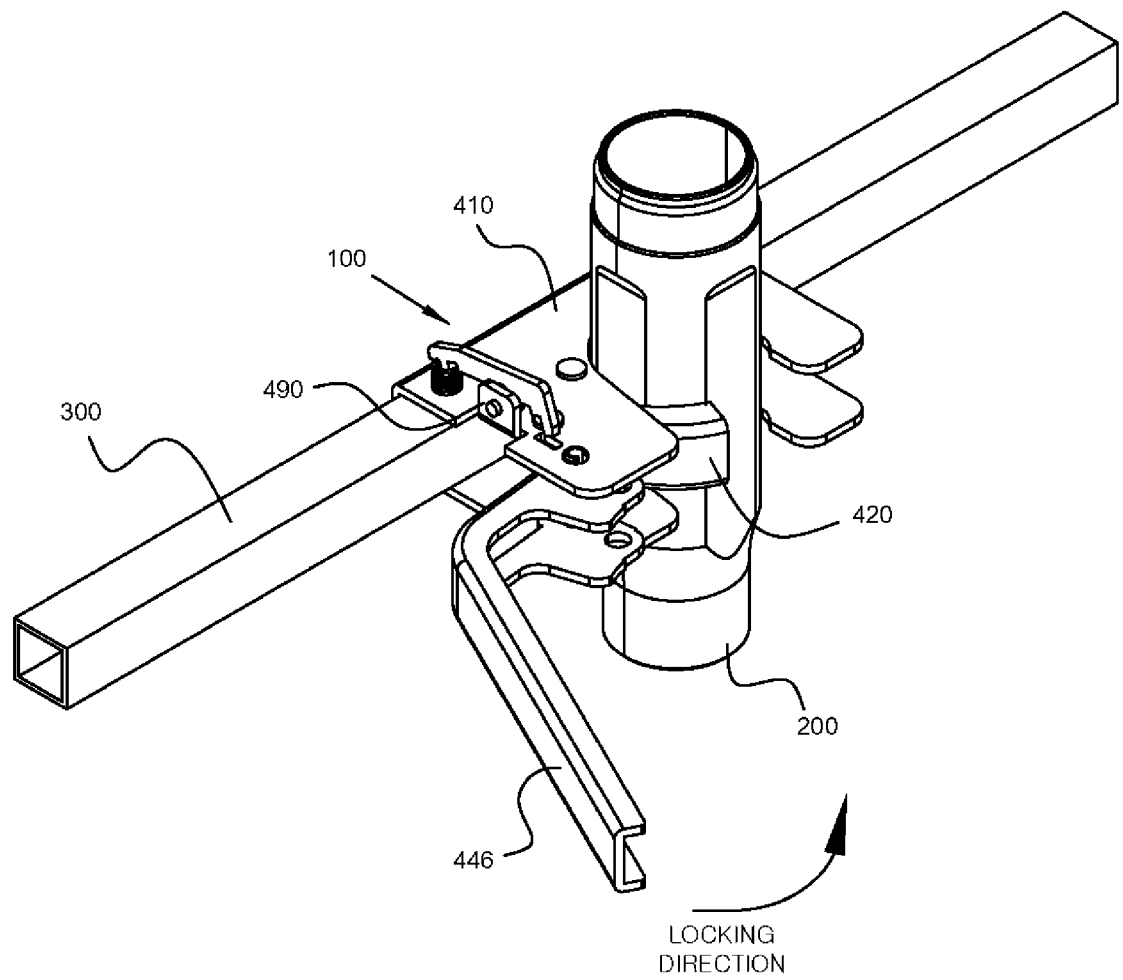
FIG. 1 is a perspective view showing an unlocked state of a sprinkler center bracket according to the present invention after a sprinkler is inserted.

Advantages and features of the present invention and a method of achieving the same will be more clearly understood from embodiments described below with reference to the accompanying drawings. However, the present invention is not limited to the following embodiments and may be implemented in various different forms. The embodiments are provided merely to complete the present invention and to fully provide a person having ordinary skill in the art to which the present invention pertains with the category of the present invention. The present invention is defined only by the category of the claims.

The terms used in this specification are provided only to explain specific embodiments, but are not intended to restrict the present invention. A singular representation may include a plural representation unless mentioned otherwise. It will be further understood that the terms "comprises" and/or "comprising," when used in this specification, specify the presence of stated elements, but do not preclude the presence or addition of one or more other elements. Wherever possible, the same reference numbers will be used throughout the specification to refer to the same or like elements, and the term "and/or" includes any and all combinations of one or more of the mentioned elements. It will be understood that, although the terms "first", "second", etc. may be used herein to describe various elements, these elements should not be limited by these terms. These terms are only used to distinguish one element from another. Therefore, a first element could be termed a second element within a technical idea of the present invention.

Unless otherwise defined, all terms (including technical and scientific terms) used in this specification have the same meaning as commonly understood by a person having ordinary skill in the art to which the present invention pertains. It will be further understood that terms, such as those defined in commonly used dictionaries, should be interpreted as having a meaning that is consistent with their meaning in the context of the relevant art and the present invention, and will not be interpreted in an idealized or overly formal sense unless expressly so defined herein.

Spatially relative terms such as "below," "beneath," "lower," "above," or "upper" may be used herein to describe one element's relationship to another element as illustrated in the drawings. It will be understood that spatially relative terms are intended to encompass different orientations of the elements during use or operation of the elements in addition to the orientation depicted in the drawings. For example, if the elements in one of the drawings are turned over, elements described as "below" or "beneath" other elements would then be oriented "above" the other elements. The exemplary terms "below" or "beneath" can, therefore, encompass both an orientation of above and below. Since the elements may be oriented in another direction, spatially relative terms may be interpreted in accordance with the orientation of the elements.

The present invention relates to a sprinkler center bracket provided with a locker for preventing unlocking of a cam lever coupled thereto, the sprinkler center bracket being used to fix a fire sprinkler 200 to end brackets, formed at opposite ends of a support frame 300 in order to fix the support frame to a ceiling, and to the support frame 300, the sprinkler center bracket including a center bracket and a cam protrusion tight-contact unit, the sprinkler center bracket being equipped with the locker 100 for preventing unlocking of the cam lever, wherein the locker 100 for preventing unlocking of the cam lever includes: a locker body 10 configured to be rotated about a fixing member 50 for fixing the locker as a central axis of rotation, wherein the body 10 is provided at one end thereof with a locker protrusion 20 and at the other end thereof with a spring protrusion 30, an elastic spring 60 is installed on the spring protrusion 30, and the body 10 is provided at a central portion thereof with a fixing hole 40; the center bracket 410, which is provided at one side thereof with a fixing protrusion 490, wherein a fixing hole 492 is formed in the fixing protrusion 490, and a locker protrusion through-hole 494 is formed at one side of the fixing protrusion 490; the fixing member 50, which extends through the fixing hole 40 of the locker body 10 so as to be fixed to the fixing hole 492 of the center bracket 410; and a locker protrusion catching recess 480 formed in one end of the cam protrusion tight-contact unit 440.

In the present invention, the sprinkler center bracket includes the center bracket 410, which is provided with bent surfaces 411 and 411' bent in a '[' shape such that the sprinkler 200 is clamped in the state in which a support frame used to couple the center bracket to the sprinkler 200 is fit therein, wherein a center bracket bent recess 413 is formed between the center bracket bent surfaces 411 and 411', center bracket concave recesses 412 and 412' are formed in the center bracket bent surfaces 411 and 411', respectively, such that the sprinkler 200 is clamped by the cam protrusion tight-contact unit 440 in the state in which the sprinkler 200 is fitted in the center bracket concave recesses 412 and 412', pin holes 416 and 416' are formed in one edge of the center bracket 410 such that a cam protrusion 442 having an eccentric shaft is rotated in the state in which the cam protrusion 442 is fixed, the cam protrusion 442 is rotated about a hinge pin 450 as a central axis of rotation in the state in which the hinge pin 450 is fitted in the pin holes 416 and 416', and the locker 100 for preventing unlocking of the cam lever is coupled to one side of the center bracket 410;

the cam protrusion tight-contact unit 440, which is configured such that the cam protrusion 442 is formed at one end of a cam lever 446 such that the fire sprinkler 200 is fastened as the cam protrusion 442 having the eccentric shaft is rotated in the state in which the fire sprinkler is fitted in the center bracket concave recesses 412 and 412', pin holes 444 and 444' are formed in the edge of one end of the cam protrusion 442, the cam protrusion tight-contact unit is rotated about the cam protrusion hinge pin 450, which is inserted into the pin holes 416 and 416', as an axis, and the cam protrusion 442 pushes a sprinkler tight-contact piece 420 formed between the cam lever 446 and the sprinkler 200 such that the sprinkler 200 is fixed to a tight-contact piece concave recess 422;

the sprinkler tight-contact piece 420, which is formed between the cam lever 446 and the sprinkler 200, wherein the tight-contact piece concave recess 422 is formed in one side of the sprinkler tight-contact piece such that the sprinkler 200 is fixed to the tight-contact piece concave recess in a tight contact state, and a hinge pin 430 is fixed to pin holes 414 of the center bracket 410 and pin holes 424 of the tight-contact piece 420 such that the sprinkler tight-contact piece is rotated about the hinge pin 430 as a central axis of rotation in the state in which the tight-contact piece 420 is coupled to the center bracket 410; and a roller bearing 456 coupled to the edge of the other end of the cam protrusion 442 in a protruding state, wherein the roller bearing is rotated about a hinge pin 460, which is mounted in pin holes 445 formed in the edge of the other end of the cam protrusion 442, as an axis such that the sprinkler 200 is pushed by the protruding roller bearing 456 so as to be fixed.

The present invention is characterized in that the hinge pins 450 and 460 are formed as elastic spring hinge pins configured to absorb repulsive force generated from the tight-contact piece 420 as the result of pressing of the cam lever 446 to hold the sprinkler 200.

Figure 2:
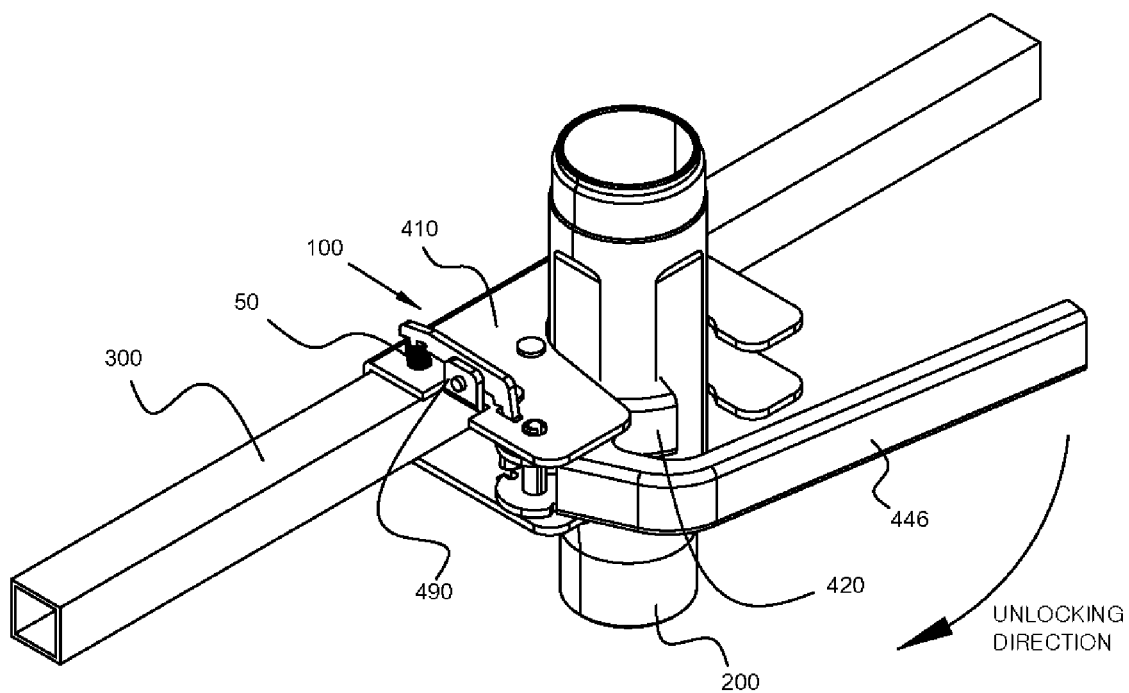
FIG. 2 is a perspective view showing a locked state of the sprinkler center bracket according to the present invention after the sprinkler is inserted.
Figure 3:
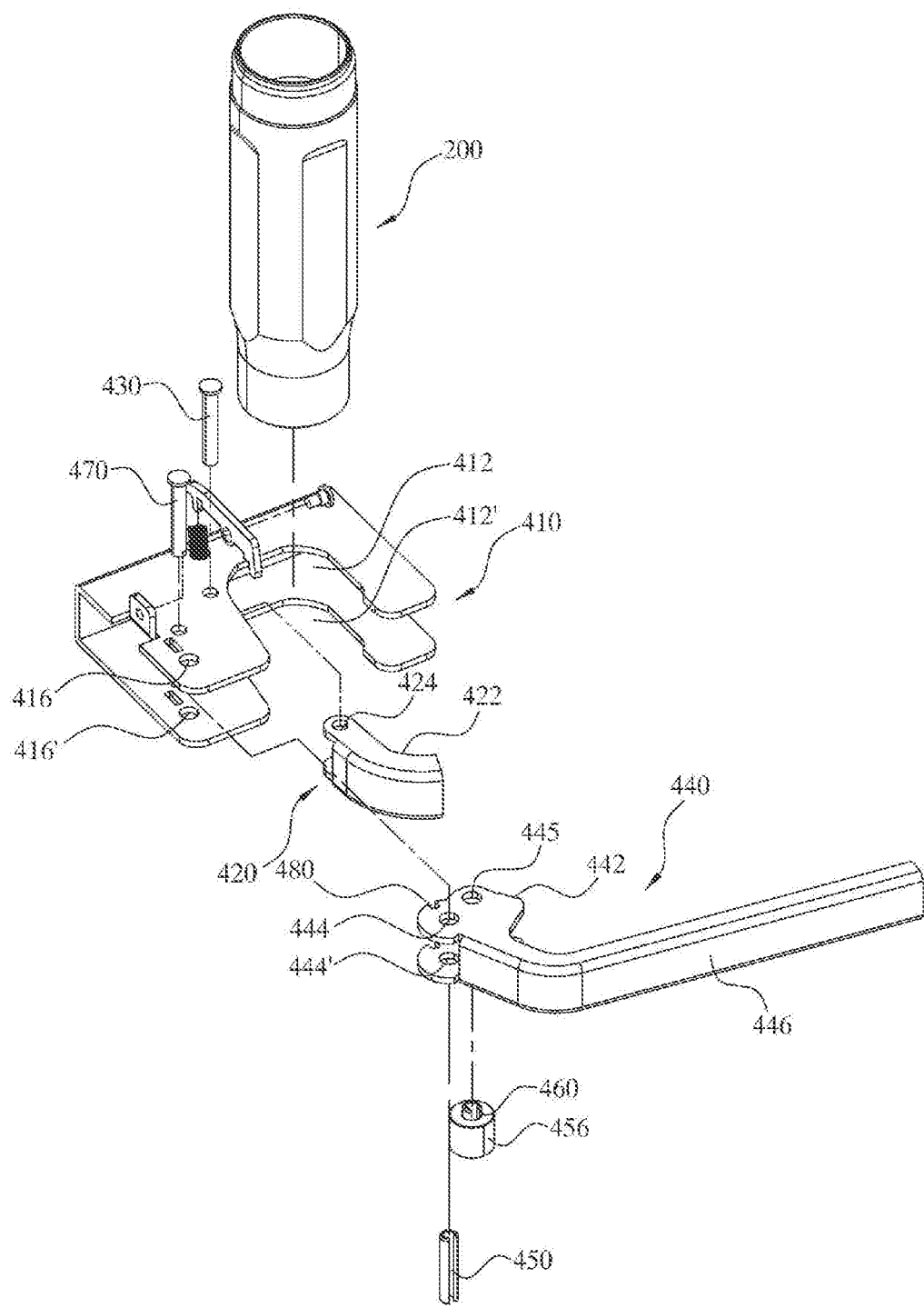
FIG. 3 is an exploded perspective view showing the state in which a body of the sprinkler center bracket according to the present invention is exploded in the state in which a locker is attached to the body.
Figure 4:
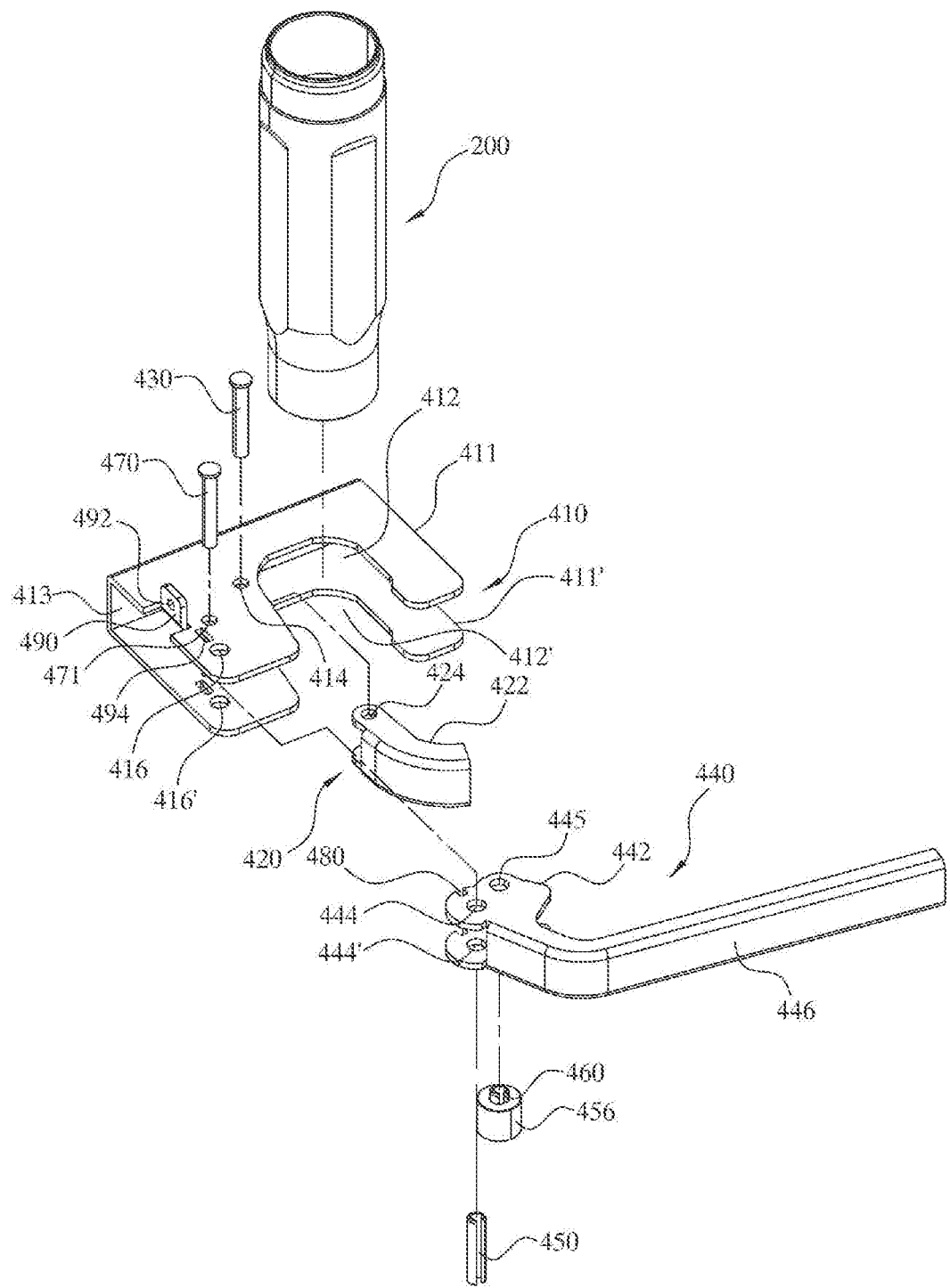
FIG. 4 is an exploded perspective view showing the state in which the body of the sprinkler center bracket according to the present invention is exploded.
Figure 5:
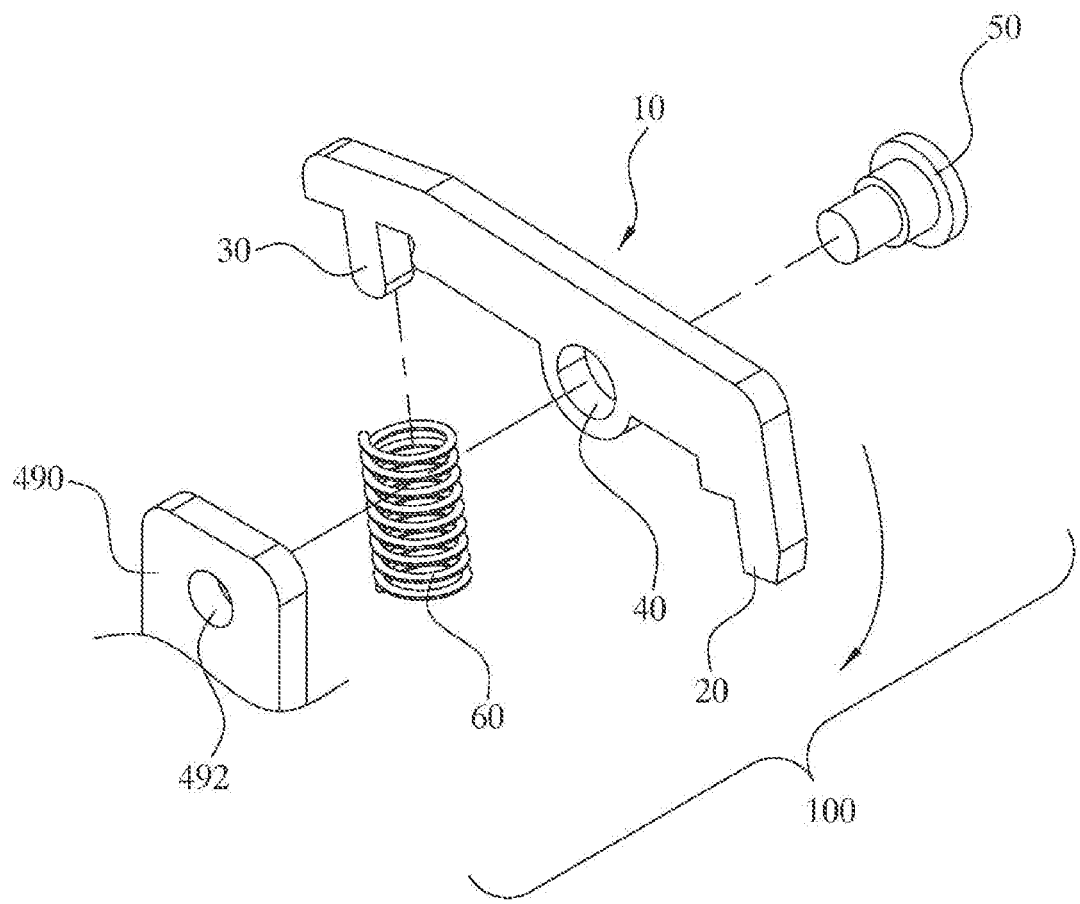
FIG. 5 is an exploded perspective view showing the locker of the sprinkler center bracket according to the present invention.
Figure 6:
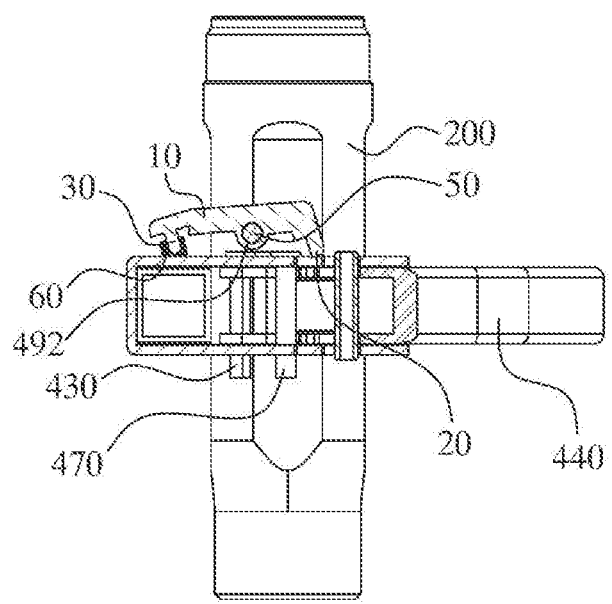
FIG. 6 is a sectional view showing an unlocked state of the locker of the sprinkler center bracket according to the present invention.
Figure 7:
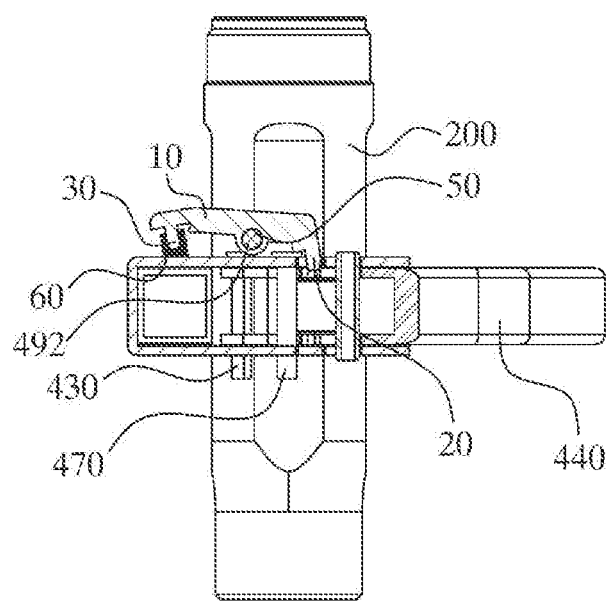
FIG. 7 is a sectional view showing a locked state of the locker of the sprinkler center bracket according to the present invention.

As shown in FIGS. 1 to 7, the present invention relates to a sprinkler center bracket used to fix a fire sprinkler 200 to end brackets, formed at opposite ends of a support frame 300 in order to fix the support frame to a ceiling, and to the support frame 300, the sprinkler center bracket including a center bracket and a cam protrusion tight-contact unit, wherein the sprinkler center bracket is provided with a locker 100 for preventing unlocking of a cam lever coupled thereto.

As shown in FIGS. 1 to 7, in the present invention, the locker 100 for preventing unlocking of the cam lever includes: a locker body 10 configured to be rotated about a fixing member 50 for fixing the locker as a central axis of rotation, wherein the body 10 is provided at one end thereof with a locker protrusion 20 and at the other end thereof with a spring protrusion 30, an elastic spring 60 is installed on the spring protrusion 30, and the body 10 is provided at a central portion thereof with a fixing hole 40; the center bracket 410, which is provided at one side thereof with a fixing protrusion 490, wherein a fixing hole 492 is formed in the fixing protrusion 490, and a locker protrusion through-hole 494 is formed at one side of the fixing protrusion 490; the fixing member 50, which extends through the fixing hole 40 of the locker body 10 so as to be fixed to the fixing hole 492 of the center bracket 410; and a locker protrusion catching recess 480 formed in one end of the cam protrusion tight-contact unit 440. When the locker protrusion 20, which is configured to be rotated about the fixing member 50 as a central axis of rotation, extends through the fixing hole 492 of the center bracket 410 and is then inserted into the locker protrusion catching recess 480, formed in one end of the cam protrusion tight-contact unit 440, it is possible to prevent the cam protrusion tight-contact unit 440, which has been rotated and fixed, from being unlocked in the opposite direction.

As shown in FIGS. 1 to 7, in the present invention, when the spring protrusion 30 is pushed and thus the elastic spring 60 is compressed, the locker protrusion 20, which is configured to be rotated about the fixing member 50 as a central axis of rotation, is separated from the locker protrusion catching recess 480 of the cam protrusion tight-contact unit 440, and the cam protrusion tight-contact unit 440, which has been fixed, is rotated in the opposite direction, whereby the locker 100 for preventing unlocking of the cam lever is unlocked.

As shown in FIGS. 1 to 7, in the present invention, the center bracket 410 is provided with bent surfaces 411 and 411' bent in a '[' shape such that the sprinkler 200 is clamped in the state in which a support frame used to couple the center bracket to the sprinkler 200 is fit therein, a center bracket bent recess 413 is formed between the center bracket bent surfaces 411 and 411', center bracket concave recesses 412 and 412' are formed in the center bracket bent surfaces 411 and 411', respectively, such that the sprinkler 200 is clamped by the cam protrusion tight-contact unit 440 in the state in which the sprinkler 200 is fitted in the center bracket concave recesses 412 and 412', pin holes 416 and 416' are formed in one edge of the center bracket 410 such that a cam protrusion 442 having an eccentric shaft is rotated in the state in which the cam protrusion 442 is fixed, the cam protrusion 442 is rotated about a hinge pin 450 as a central axis of rotation in the state in which the hinge pin 450 is fitted in the pin holes 416 and 416', and the locker 100 for preventing unlocking of the cam lever is coupled to one side of the center bracket 410, whereby it is possible to securely fix the sprinkler.

As shown in FIGS. 1 to 7, in the present invention, the cam protrusion tight-contact unit 440 is configured such that the cam protrusion 442 is formed at one end of a cam lever 446 such that the fire sprinkler 200 is fastened as the cam protrusion 442 having the eccentric shaft is rotated in the state in which the fire sprinkler is fitted in the center bracket concave recesses 412 and 412', pin holes 444 and 444' are formed in the edge of one end of the cam protrusion 442, the cam protrusion tight-contact unit is rotated about the cam protrusion hinge pin 450, which is inserted into the pin holes 416 and 416', as an axis, and the cam protrusion 442 pushes a sprinkler tight-contact piece 420 formed between the cam lever 446 and the sprinkler 200 such that the sprinkler 200 is fixed to a tight-contact piece concave recess 422, whereby it is possible to securely fix the sprinkler.

As shown in FIGS. 1 to 7, in the present invention, the sprinkler tight-contact piece 420 is formed between the cam lever 446 and the sprinkler 200, the tight-contact piece concave recess 422 is formed in one side of the sprinkler tight-contact piece such that the sprinkler 200 is fixed to the tight-contact piece concave recess in a tight contact state, and a hinge pin 430 is fixed to pin holes 414 of the center bracket 410 and pin holes 424 of the tight-contact piece 420 such that the sprinkler tight-contact piece is rotated about the hinge pin 430 as a central axis of rotation in the state in which the tight-contact piece 420 is coupled to the center bracket 410, whereby it is possible to securely fix the sprinkler.

As shown in FIGS. 1 to 7, in the present invention, a roller bearing 456 is coupled to the edge of the other end of the cam protrusion 442 in a protruding state, and the roller bearing is rotated about a hinge pin 460, which is mounted in pin holes 445 formed in the edge of the other end of the cam protrusion 442, as an axis such that the sprinkler 200 is pushed by the protruding roller bearing 456 so as to be fixed, whereby it is possible to securely fix the sprinkler.

As shown in FIGS. 1 to 7, in the present invention, a roller bearing catching pin 470 is fixed to pin holes 471 formed in the center bracket 410, whereby it is possible to securely fix the sprinkler.

As shown in FIGS. 1 to 7, in the present invention, it is preferable that each of the hinge pins 450 and 460 be formed as an elastic plate hinge pin configured to be split in the middle thereof in order to absorb repulsive force generated from the tight-contact piece 420 as the result of pressing of the cam lever 446 to hold the sprinkler 200.

In order to provide pressing force as described above, the roller bearing 456 is coupled to the edge of the other end of the cam protrusion 442 in a protruding state, and the hinge pin 460, which is mounted in the pin holes 445 formed in the edge of the other end of the cam protrusion 442, is formed as an elastic plate hinge configured to be split in the middle thereof.

The invention claimed is:

1. A sprinkler center bracket provided with a locker for preventing unlocking of a cam lever coupled thereto, the sprinkler center bracket being used to fix a fire sprinkler to end brackets, formed at opposite ends of a support frame in order to fix the support frame to a ceiling, and to the support frame, the sprinkler center bracket comprising a center bracket and a cam protrusion tight-contact unit, the sprinkler center bracket being equipped with the locker for preventing unlocking of the cam lever, wherein the locker for preventing unlocking of the cam lever comprises:

a locker body configured to be rotated about a fixing member for fixing the locker as a central axis of rotation, wherein the body is provided at one end thereof with a locker protrusion and at the other end thereof with a spring protrusion, an elastic spring is installed on the spring protrusion, and the body is provided at a central portion thereof with a fixing hole;

the center bracket, which is provided at one side thereof with a fixing protrusion, wherein a fixing hole is formed in the fixing protrusion, and a locker protrusion through-hole is formed at one side of the fixing protrusion;

the fixing member, which extends through the fixing hole of the locker body so as to be fixed to the fixing hole of the center bracket; and a locker protrusion catching recess formed in one end of the cam protrusion tight-contact unit.

2. The sprinkler center bracket according to claim 1, wherein the sprinkler center bracket comprises:

the center bracket, which is provided with bent surfaces bent in a '[' shape such that the sprinkler is clamped in a state in which a support frame used to couple the center bracket to the sprinkler is fit therein, wherein a center bracket bent recess is formed between the center bracket bent surfaces, center bracket concave recesses are formed in the center bracket bent surfaces, respectively, such that the sprinkler is clamped by the cam protrusion tight-contact unit in a state in which the sprinkler is fitted in the center bracket concave recesses, pin holes are formed in one edge of the center bracket such that a cam protrusion having an eccentric shaft is rotated in a state in which the cam protrusion is fixed, the cam protrusion is rotated about a hinge pin as a central axis of rotation in a state in which the hinge pin is fitted in the pin holes, and the locker for preventing unlocking of the cam lever is coupled to one side of the center bracket;

the cam protrusion tight-contact unit, which is configured such that the cam protrusion is formed at one end of a cam lever such that the fire sprinkler is fastened as the cam protrusion having the eccentric shaft is rotated in a state in which the fire sprinkler is fitted in the center bracket concave recesses, pin holes are formed in the edge of one end of the cam protrusion, the cam protrusion tight-contact unit is rotated about the cam protrusion hinge pin, which is inserted into the pin holes, as an axis, and the cam protrusion pushes a sprinkler tight-contact piece formed between the cam lever and the sprinkler such that the sprinkler is fixed to a tight-contact piece concave recess;

the sprinkler tight-contact piece, which is formed between the cam lever and the sprinkler, wherein the tight-contact piece concave recess is formed in one side of the sprinkler tight-contact piece such that the sprinkler is fixed to the tight-contact piece concave recess in a tight contact state, and a hinge pin is fixed to pin holes of the center bracket such that the sprinkler tight-contact piece is rotated about the hinge pin as a central axis of rotation in a state in which the tight-contact piece is coupled to the center bracket; and a roller bearing coupled to the edge of the other end of the cam protrusion in a protruding state, wherein the roller bearing is rotated about a hinge pin, which is mounted in pin holes formed in the edge of the other end of the cam protrusion, as an axis such that the sprinkler is pushed by the protruding roller bearing so as to be fixed.

3. The sprinkler center bracket according to claim 2, wherein each of the hinge pins is formed as an elastic plate hinge pin configured to be split in a middle thereof in order to absorb repulsive force generated from the tight-contact piece as a result of pressing of the cam lever to hold the sprinkler.

* * * * *